United States Patent
Tsuru et al.

(10) Patent No.: US 9,738,806 B2
(45) Date of Patent: Aug. 22, 2017

(54) INKJET INK, PRINTING METHOD, AND CERAMIC ELECTRONIC COMPONENT

(71) Applicant: MURATA MANUFACTURING CO., LTD., Nagaokakyo-shi, Kyoto-Fu (JP)

(72) Inventors: Akihiro Tsuru, Nagaokakyo (JP); Taketsugu Ogura, Nagaokakyo (JP); Naoaki Ogata, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 187 days.

(21) Appl. No.: 14/543,994

(22) Filed: Nov. 18, 2014

(65) Prior Publication Data
US 2015/0070818 A1 Mar. 12, 2015

Related U.S. Application Data

(63) Continuation of application No. PCT/JP2013/062810, filed on May 7, 2013.

(30) Foreign Application Priority Data

May 18, 2012 (JP) .................................. 2012-114173

(51) Int. Cl.
*H01G 4/06* (2006.01)
*C09D 11/52* (2014.01)
(Continued)

(52) U.S. Cl.
CPC .............. *C09D 11/52* (2013.01); *C09D 11/00* (2013.01); *C09D 11/322* (2013.01); *C09D 11/36* (2013.01);
(Continued)

(58) Field of Classification Search
CPC ....... H01G 4/008; H01B 1/22; C04B 35/4682
(Continued)

(56) References Cited

U.S. PATENT DOCUMENTS 7,683,107 B2 3/2010 Yang
7,780,910 B2 8/2010 Halstead et al.
(Continued)

FOREIGN PATENT DOCUMENTS

CN 102365694 A 2/2012
JP 09-219339 8/1997
(Continued)

OTHER PUBLICATIONS

PCT/JP2013/062810 Written Opinion dated Jul. 29, 2013.
(Continued)

*Primary Examiner* — Khanh Tuan Nguyen
(74) *Attorney, Agent, or Firm* — Arent Fox LLP (57) ABSTRACT

An inkjet ink that contains a functional particle having a BET-equivalent particle diameter of 50 to 1000 nm, a rheology-controlling particle having a BET-equivalent particle diameter of 4 to 40 nm, and an organic vehicle. The ink has a viscosity of 1 to 50 mPa·s at a shear rate of 1000 s$^{-1}$. At a shear rate of 0.1 s$^{-1}$, the ink has a viscosity equal to or higher than a viscosity η calculated using the following equation: $\eta=(D)^2 \times \rho/10^4/2+80$ [where η is the viscosity (mPa·s) at a shear rate of 0.1 s$^{-1}$, D is the BET-equivalent particle diameter (nm) of the functional particle, and ρ is the specific gravity of the functional particle].

20 Claims, 1 Drawing Sheet

(51) Int. Cl.
*C09D 11/00* (2014.01)
*C09D 11/322* (2014.01)
*C09D 11/36* (2014.01)
*H01G 4/30* (2006.01)
*C09D 11/38* (2014.01)
*H01G 4/008* (2006.01)
*H01G 4/012* (2006.01)
*H01G 4/12* (2006.01)
*H01G 4/248* (2006.01)

(52) U.S. Cl.
CPC ............. *C09D 11/38* (2013.01); *H01G 4/008* (2013.01); *H01G 4/012* (2013.01); *H01G 4/12* (2013.01); *H01G 4/248* (2013.01); *H01G 4/30* (2013.01)

(58) Field of Classification Search
USPC .................................. 361/305, 321.2; 427/79
See application file for complete search history.

(56) References Cited

U.S. PATENT DOCUMENTS

2004/0061747 A1  4/2004  Nakao et al.
2008/0026136 A1*  1/2008  Skamser ............. C04B 35/4682
                                                    427/79
2009/0293766 A1  12/2009  Kamikoriyama et al.
2012/0147521 A1*  6/2012  Kim ......................... H01B 1/22
                                                    361/321.2
2012/0162855 A1*  6/2012  Suh ........................ H01G 4/008
                                                    361/305

FOREIGN PATENT DOCUMENTS

| | | |
|---|---|---|
| JP | 2000-327964 A | 11/2000 |
| JP | 2002-100543 A | 4/2002 |
| JP | 2002-121437 A | 4/2002 |
| JP | 2005-109176 A | 4/2005 |
| JP | 2005-223323 A | 8/2005 |
| JP | 2006-028320 A | 2/2006 |
| JP | 2007-119683 A | 5/2007 |
| JP | 2007-123198 A | 5/2007 |
| JP | 2007-119683 A | 6/2007 |
| JP | 2009-138030 A | 6/2009 |
| JP | 4303715 B2 | 7/2009 |
| WO | WO-02/090117 A1 | 11/2002 |
| WO | WO-2006/041030 A1 | 4/2006 |

OTHER PUBLICATIONS

PCT/JP2013/062810 ISR dated Jul. 29, 2013.
Chinese Office Action issued Jun. 18, 2015, in corresponding Chinese Patent Application No. 201380025840.7.

* cited by examiner

INKJET INK, PRINTING METHOD, AND CERAMIC ELECTRONIC COMPONENT

CROSS REFERENCE TO RELATED APPLICATIONS

The present application is a continuation of International application No. PCT/JP2013/062810, filed May 7, 2013, which claims priority to Japanese Patent Application No. 2012-114173, filed May 18, 2012, the entire contents of each of which are incorporated herein by reference.

FIELD OF THE INVENTION

This invention relates to an inkjet ink and, in particular, relates to an inkjet ink suitably used in the production of a ceramic electronic component. This invention also relates to a printing method that is performed using this inkjet ink, and to a ceramic electronic component constructed using this inkjet ink.

BACKGROUND OF THE INVENTION

The production of an electronic component such as a multilayer capacitor or a ceramic multilayer substrate includes a step of forming an electrode. A method for forming this electrode is one based on screen printing or gravure printing, in which an electroconductive paste that contains a metal powder as an electroconductive component is applied to a ceramic or similar device section to form an electroconductive paste film, and this electroconductive paste film is heat-treated to form the electrode.

Such a screen printing or gravure printing method is suitable for mass production, but the use of a printing plate makes this method unsuitable for high-mix low-volume production and the formation of an electrode in a complicated pattern. Thus inkjet printing has been attracting attention as a new printing method.

Inkjet printing cannot be performed using an electroconductive paste or an electroconductive ink in the same way as in screen printing or gravure printing. Examples of proposed electroconductive inks that can be used in inkjet printing include the following.

Japanese Unexamined Patent Application Publication No. 2000-327964 (Patent Document 1) proposes an organic-solvent-based electroconductive ink containing a metal powder having a particle diameter of 10 µm or less and having a viscosity of 200 mPa·s or less with a sedimentation of 10 mm or less in 10 minutes or 20 mm or less in 100 minutes.

Japanese Unexamined Patent Application Publication No. 2002-121437 (Patent Document 2) proposes an organic-solvent-based electroconductive ink containing a metal particle having a particle diameter of 100 nm or less, preferably 10 nm or less, and having a viscosity of 1 to 100 mPa·s and a surface tension of 25 to 80 mN/m.

Japanese Patent No. 4303715 (Patent Document 3) proposes an organic-solvent-based electroconductive paste, although this paste is not intended for inkjet printing. Besides containing an electroconductive particle, this paste contains a particle that is based on the same main component as a dielectric ceramic material that forms the ceramic body of a ceramic electronic component to which this paste is applied, i.e., a material-matched (dielectric) particle. The electroconductive particle has a particle diameter of 10 to 100 nm, the ratio of the particle diameter of the electroconductive particle to that of the material-matched particle is in the range of 0.1 to 0.25, and the amount of addition of the matching material is in the range of 5% to 30% by mass per 100% by mass of the electroconductive particle. As presented in Table 4 of Patent Document 3, the smallest particle diameter of the material-matched particles used in Examples was 30 nm. The publication does not show any data obtained with a smaller diameter of the material-matched particle.

Japanese Unexamined Patent Application Publication No. 2006-28320 (Patent Document 4) proposes an aqueous metal ink for inkjet printing having a viscosity of 35 mPa·s or less. Unlike organic-solvent-based inks, aqueous metal inks contain ionic resins as a dispersant and a binder. The metal particle contained in the aqueous metal ink described in Patent Document 4 has a particle diameter of 50 to 400 nm. Although this aqueous metal ink also contains a matching material (a barium titanate powder) as a constituent, Patent Document 4 mentions nothing about the range of the particle diameter of the matching material. In Examples, a barium titanate powder having a particle diameter of 200 nm is the only disclosed matching material.

When producing a ceramic electronic component and trying to form an electrode using inkjet printing, however, one faces the following problems with the technologies described in Patent Documents 1 to 4.

The electroconductive ink described in Patent Document 1 has sedimentation characteristics that allow for a sedimentation of 10 mm or less in 10 minutes or 20 mm or less in 100 minutes. With such a level of sedimentability, it is difficult to form a printed film with uniform thickness in a stable manner because the applied ink often varies in thickness as a result of sedimentation.

An ink that contains a metal particle having a particle diameter that falls within a range of the particle diameter of a metal particle like that described in Patent Document 2, 100 nm or less, e.g., an ink containing a metal particle having a particle diameter of less than 50 nm, forms a colloid. As a result, the metal particle settles more slowly than one having a larger diameter. With such an ink it is relatively easy to form a printed film with uniform thickness in a stable manner. With an ink that contains a metal particle having a particle diameter in the range of 50 to 100 nm, however, it is difficult to form a printed film with uniform thickness in a stable manner because the applied ink often varies in thickness as a result of sedimentation. Making the particle diameter 50 nm or more often causes problems of seriously blurred printed dots and graphics as well. Furthermore, a printed film formed using an ink that contains a metal particle having a particle diameter of 100 nm or less has a very low heat shrinkage temperature compared with a ceramic layer. This means that differential shrinkage occurs during firing, often causing cracks and other structural defects in the ceramic electronic component.

The electroconductive paste described in Patent Document 3 does not have a rheology suitable for inkjet printing. As far as in the Examples described in Patent Document 3, what is disclosed is an electroconductive paste for screen printing. If this paste were given a viscosity that allows for inkjet printing, making the diameter of the electroconductive particle 50 nm or more would often cause problems of seriously blurred printed dots and graphics. Furthermore, the electroconductive paste described in Patent Document 3, in which the ratio of the diameter of the electroconductive particle to that of the material-matched particle is too high, ranging from 0.1 to 0.25, experiences a significant sedimentation of the electroconductive particle where the diameter of the electroconductive particle is 150 nm or more. With this paste, therefore, it is difficult to form a printed film with uniform thickness in a stable manner.

The metal ink described in Patent Document 4, which is an aqueous ink, is extremely slow to dry. In such a case, significant printing bleeds and a long time needed for the ink to dry cause the problem of limited printing speed. The use of a ceramic sheet that has an increased number of pores for water absorbency like ordinary inkjet paper solves the bleeding issue, but at the same time seriously shrinks when fired, often causing structural defects in the ceramic electronic component. Furthermore, an aqueous ink is unsuitable for printing on a ceramic electronic component because of limited options of usable binders.

In producing a multilayer ceramic electronic component, the following problem can be encountered. That is, when an electroconductive film to serve as an inner electrode is formed on a ceramic green sheet, a height gap resulting from the thickness of this film accumulates as multiple ceramic green sheets are stacked. The accumulated height gap can cause delamination of the multilayer body or any similar situation, and can also cause cracks and other structural defects during a firing step. To solve this problem, Japanese Unexamined Patent Application Publication No. 9-219339 (Patent Document 5) proposes forming a leveling layer for compensating for a height gap resulting from the thickness of an inner electrode by applying a ceramic ink through inkjet printing.

Japanese Unexamined Patent Application Publication No. 2005-223323 (Patent Document 6) describes an ink composition that can be applied to a substrate through inkjet printing. This ink composition contains (a) a functional material, (b) an organic polymer containing polyvinyl pyrrolidone, and (c) a dispersion vehicle selected from an organic solvent, water, or their mixture, with the functional material and the organic polymer dispersed in the dispersing vehicle. The viscosity of this ink composition ranges from 5 mPa·s to 50 mPa·s at temperatures of 25° C. to 35° C. The functional material is a material having a function such as electroconductivity, resistance, or dielectricity. The publication lists materials such as a variety of metals and barium titanate as specific examples. Paragraph [0026] of Patent Document 6 states that it is preferred that the D50 particle diameter of the functional material be in the range of 0.005 μm to 2 μm.

When containing a metal as the functional material, the ink composition described in Patent Document 6 can be used to form an electrode in a ceramic electronic component through inkjet printing. When containing a ceramic material (a resistor or a dielectric) as the functional material, this ink composition can be used to form, through inkjet printing, a leveling layer for compensating for a height gap that occurs in a multilayer ceramic electronic component as a result of the thickness of an inner electrode.

As detailed below, however, the ink composition described in Patent Document 6 also has problems that need to be solved.

When the functional material is a metal, problems similar to the aforementioned ones with the technologies described in Patent Documents 1 to 3 can be encountered.

Likewise, when the functional material is a ceramic material and the ink composition is used to form a printed film for a leveling layer in a multilayer ceramic electronic component, problems nearly similar to the aforementioned ones with the technologies described in Patent Documents 1 to 3 can be encountered. This means that when the particle diameter of the functional material is 50 nm or more, significant sedimentation makes it impossible to form a coating with uniform thickness in a stable manner through printing, and problems of seriously blurred printed dots and graphics occur. When the particle diameter of the functional material is less than 50 nm, the ink composition forms a colloid, making the particle less likely to settle. This particle diameter is, however, much smaller than the pre-firing BET-equivalent particle diameter (100 nm or more) of a particle that is the main component of the ceramic section of an ordinary ceramic electronic component. The subsequent relatively large differential shrinkage that occurs during firing causes cracks and other structural defects in the ceramic electronic component.

An inkjet ink must therefore have a low viscosity than that of a known ink or paste for screen printing or gravure printing. The use of an ink that falls within such a low viscosity range and contains a functional particle (an electroconductive particle or a ceramic particle) having a particle diameter of 50 nm or less, however, suffers from problems of the sedimentation of the metal particle and seriously blurred printed dots or graphics. Making the particle diameter of the functional particle less than 50 nm often causes structural defects to occur while the ceramic electronic component is fired.

An inkjet ink containing a particle having a particle diameter of 50 nm or more therefore need to have all of three characteristics consisting of viscosity characteristics that allow for inkjet printing, sedimentation characteristics that ensure stable printing, and the nature of being unlikely to bleed after printing. When applied to a ceramic electronic component, this inkjet ink must have heat shrinkage characteristics that allow the ink to shrink without causing structural defects, besides the above three characteristics.

In addition, the sedimentation issue is relatively minor for an aqueous ink because the electrostatic and steric repulsions exercised by ionic resins stabilize the particle in a dispersed state. As for an organic ink, which is suitable for printing on a ceramic electronic component, the sedimentation issue is very significant because no electrostatic repulsion occurs.

Stokes' law below is known as a classic equation for the rate of sedimentation of a particle:

$$vs = \{Dp^2(\rho p - \rho f)g\}/18\eta$$

(where vs is the rate of sedimentation of the particle, Dp is the diameter of the particle, ρp is the specific gravity of the particle, ρf is the specific gravity of the dispersion medium, g is the gravitational acceleration, and η is the viscosity of the dispersion medium).

Stokes' law indicates that in an organic ink in which a particle having a particle diameter of 50 nm or more is dispersed, increasing the viscosity η of the dispersion medium effectively reduces troublesome sedimentation of the particle.

In general, η in Stokes' equation is construed as a spatial viscosity (the viscosity of the vehicle system). This leads to the conclusion that η can be increased only through an approach that makes viscosity develop only in a space, such as increasing the viscosity of the solvent, adding a thickening resin, or adding a thixotropic agent. However, increasing the spatial viscosity to a level high enough to reduce the sedimentation of the particle causes the user to encounter a problem of the inability to apply the ink through inkjet printing because the ink remains highly viscous (has not sufficiently lost its viscosity) even at a moment of inkjet printing, at which a high shear force is applied.

It is therefore very difficult to solve the sedimentation issue with an organic ink containing a particle having a particle diameter of 50 nm or more while ensuring viscosity characteristics that allow for inkjet printing.

Patent Document 1: Japanese Unexamined Patent Application Publication No. 2000-327964

Patent Document 2: Japanese Unexamined Patent Application Publication No. 2002-121437

Patent Document 3: Japanese Patent No. 4303715

Patent Document 4: Japanese Unexamined Patent Application Publication No. 2006-28320

Patent Document 5: Japanese Unexamined Patent Application Publication No. 9-219339

Patent Document 6: Japanese Unexamined Patent Application Publication No. 2005-223323

SUMMARY OF THE INVENTION

Thus an object of this invention is to try to provide an ink that can be suitably used when an electrode or a leveling layer of a ceramic electronic component is formed through inkjet printing, or more specifically an inkjet ink that contains a functional particle having a particle diameter of 50 nm or more and at the same time has all of the aforementioned three characteristics, i.e., viscosity characteristics that allow for inkjet printing, sedimentation characteristics that ensure stable printing, and the nature of being unlikely to bleed after printing, as well as having heat shrinkage characteristics that allow the ink to shrink without causing structural defects when applied to a ceramic electronic component.

Another object of this invention is to try to provide a printing method that is performed using this inkjet ink.

Yet another object of this invention is to try to provide a ceramic electronic component constructed using this inkjet ink.

This invention is first directed to an inkjet ink.

An inkjet ink according to this invention contains a functional particle having a BET-equivalent average particle diameter (hereinafter simply referred to as "an average particle diameter") of 50 nm to 1000 nm, a rheology-controlling particle having an average particle diameter of 4 nm to 40 nm, and an organic vehicle. The inkjet ink has a viscosity of 1 mPa·s to 50 mPa·s at a shear rate of 1000 s$^{-1}$. At a shear rate of 0.1 s$^{-1}$, the inkjet ink has a viscosity equal to or higher than a viscosity η calculated using $$\eta = (D)^2 \times \rho / 10^4 / 2 + 80 \qquad \text{Equation 1:}$$

[where η is the viscosity (mPa·s) at a shear rate of 0.1 s$^{-1}$, D is the average particle diameter (nm) of the functional particle, and ρ is the specific gravity of the functional particle].

As mentioned above, adding a rheology-controlling particle having an average particle diameter of 4 nm to 40 nm to a functional particle having an average particle diameter of 50 nm to 1000 nm leads to the development of a special rheology that can give the ink all of viscosity characteristics that allow for inkjet printing, sedimentation characteristics that ensure stable printing, and the nature of being unlikely to bleed after printing.

When an inkjet ink according to this invention is used in the production of a ceramic electronic component, the rheology-controlling particle is preferably made of a ceramic material. More specifically, when the functional particle is made of a substance having a relatively low melting point, such as a metal, adding a ceramic rheology-controlling particle provides a sufficient anti-shrinkage effect and thus leads to an inhibitory effect on the occurrence of structural defects, making it possible to produce a ceramic electronic component that is unlikely to crack or have any other structural defect after being fired. When the functional particle is made of a ceramic material, adding a ceramic rheology-controlling particle makes it possible to produce a ceramic electronic component that is unlikely to crack or have any other structural defect after being fired, without affecting the heat shrinkage characteristics of the functional particle.

Preferably, the rheology-controlling particle is made of an oxide having a perovskite structure. This gives the inkjet ink according to this invention characteristics more suitable for the formation of an electrode of a ceramic electronic component.

Ensuring that the organic vehicle in an inkjet ink according to this invention is a mixture of an organic solvent and at least one resin selected from a cellulose-based resin, an acrylic resin, and a cyclic-acetal-based resin gives the ink characteristics more suitable for inkjet printing.

When the functional particle in an inkjet ink according to this invention has a volume of 100 parts by volume, it is preferred that the amount of addition of the rheology-controlling particle be in the range of 3.0 parts by volume to 42.4 parts by volume. This gives the rheology-controlling particle a higher rheology-controlling effect. When the functional particle is made of a substance having a relatively low melting point, such as a metal, this additionally ensures that the rheology-controlling particle has an anti-shrinkage effect.

When an inkjet ink according to this invention is for use in a ceramic electronic component having an electrode and a ceramic body holding the electrode and is used to form a printed film that is to serve as the electrode, the functional particle is an electroconductive particle. The electrode can be an outer electrode formed on an outer surface of the ceramic body or an inner electrode contained in the ceramic body.

In the above case, the electroconductive particle is preferably made of at least one metal selected from the group consisting of Au, Pt, Ag, Ni, Cu, Al, and Fe or an alloy containing at least one metal selected from this group. These metals are suitable for use as materials for an electrode in a ceramic electronic component.

In the above case, the rheology-controlling particle is preferably based on the same main component as the ceramic body. This gives the inkjet ink according to this invention characteristics more suitable for the ink to be used in forming an electrode in a ceramic electronic component.

When an inkjet ink according to this invention is for use in a ceramic electronic component having a ceramic body having a multilayer structure formed by multiple stacked ceramic layers, an inner electrode formed along a boundary between the ceramic layers, and a leveling layer for compensating for a height gap resulting from the thickness of the inner electrode, with the leveling layer formed in the area where the inner electrode is not formed in the boundary between the ceramic layers, and when the inkjet ink is used to form a printed film that is to serve as the leveling layer, the functional particle is a ceramic particle.

In this case, the ceramic particle to serve as the functional particle is preferably based on the same main component as the ceramic layers. This makes the inkjet ink according to this invention more suitable for the formation of the leveling layer.

In the above case, the average particle diameter of the functional particle is preferably in the range of 48% to 152% of the pre-firing average particle diameter of the ceramic particle that is the main component contained in the ceramic layers. This gives the inkjet ink according to this invention characteristics more suitable for the ink to be used in forming an leveling layer in a ceramic electronic component.

This invention is also directed to a printing method in which a printed film of an inkjet ink described above is formed using an inkjet apparatus.

Moreover, this invention is directed to a ceramic electronic component constructed using an inkjet ink described above.

A first embodiment of a ceramic electronic component according to this invention has an electrode and a ceramic body holding the electrode. The electrode is formed by firing a printed film formed using an inkjet ink. In this case, the inkjet ink is one that contains an electroconductive particle as the functional particle.

A second embodiment of a ceramic electronic component according to this invention has a ceramic body having a multilayer structure formed by multiple stacked ceramic layers, an inner electrode formed along a boundary between the ceramic layers, and a leveling layer for compensating for a height gap resulting from the thickness of the inner electrode. The leveling layer is formed in the area where the inner electrode is not formed in the boundary between the ceramic layers. The leveling layer is formed by firing a printed film formed using an inkjet ink. In this case, the inkjet ink is one that contains a ceramic particle as the functional particle.

A third embodiment of the ceramic electronic component according to this invention has a ceramic body having a multilayer structure formed by multiple stacked ceramic layers, an inner electrode formed along a boundary between the ceramic layers, and a leveling layer for compensating for a height gap resulting from the thickness of the inner electrode. The leveling layer is formed in the area where the inner electrode is not formed in the boundary between the ceramic layers. Each of the inner electrode and the leveling layer is formed by firing a printed film formed using an inkjet ink. The inkjet ink used to form the inner electrode is one that contains an electroconductive particle as the functional particle, and the inkjet used to form the leveling layer is one that contains a ceramic particle as the functional particle.

An inkjet ink according to this invention allows the user to perform smooth and stable inkjet printing. A printed film of the ink is unlikely to bleed.

A printing method according to this invention allows the user to perform printing without a printing plate. This method therefore makes it possible to form small quantities of various products and printed films in complicated graphics.

A ceramic electronic component according to this invention is unlikely to have structural defects that can occur therein.

DETAILED DESCRIPTION OF THE PREFERRED EMBODIMENTS

Figure 1:
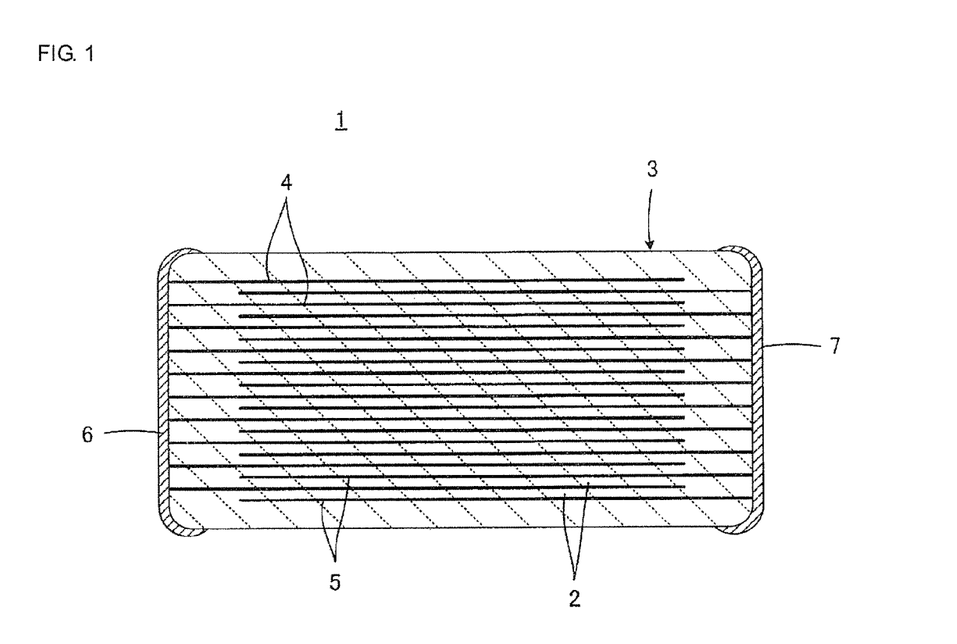
FIG. 1 is a cross-sectional view of a multilayer ceramic capacitor 1 as an example of a ceramic electronic component constructed using an inkjet ink according to this invention.

Referring to FIG. 1, the following describes a multilayer ceramic capacitor 1 constructed using an inkjet ink according to this invention.

The multilayer ceramic capacitor 1 has a ceramic body 3 having a multilayer structure formed by multiple stacked ceramic layers 2, and also has multiple first inner electrodes 4 and multiple second inner electrodes 5 individually formed along multiple boundaries between the ceramic layers 2. The ceramic layers 2 of the multilayer ceramic capacitor 1 are composed of a dielectric ceramic material. The first inner electrodes 4 and the second inner electrodes 5 face each other across the ceramic layers 2 to form capacitances and are arranged alternately in the direction of stacking.

On either end surface of the ceramic body 3, a first outer electrode 6 is formed so as to be electrically connected to the first inner electrodes 4. On the other end surface, a second outer electrode 7 is formed so as to be electrically connected to the second inner electrodes 5.

Figure 2:
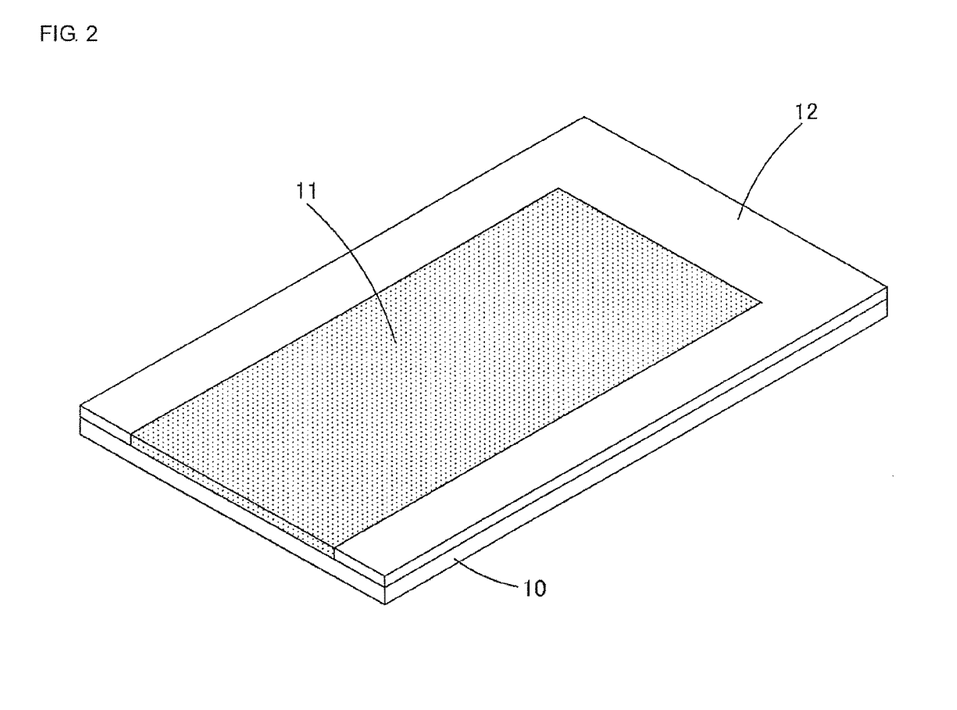
FIG. 2 is a perspective view of a ceramic green sheet 10 provided for the production of the multilayer ceramic capacitor 1 illustrated in FIG. 1.

For the production of this multilayer ceramic capacitor 1, ceramic green sheets 10 like the one illustrated in FIG. 2 are provided. The ceramic green sheets 10 are to serve as the ceramic layers 2. Although ceramic green sheets provided in actual mass production of the multilayer ceramic capacitor 1 have dimensions large enough for multiple multilayer ceramic capacitors 1 to be taken out in a later cutting step, FIG. 2 illustrates a ceramic green sheet 10 for one multilayer ceramic capacitor 1 for convenience of explanation.

One either main surface of the ceramic green sheet 10, an inner-electrode printed film 11 is formed that later serves as an inner electrode 4 or 5. The inner-electrode printed film 11 has a certain thickness, and this thickness causes a height gap to appear on the ceramic green sheet 10.

In the area where the inner-electrode printed film 11 is not present on the main surface of the ceramic green sheet 10, a leveling printed film 12 is formed. The leveling printed film 12 later serves as a leveling layer for compensating for the aforementioned height gap resulting from the thickness of the inner-electrode printed film 11. The step of forming the leveling printed film 11 may be performed before the step of forming the inner-electrode printed film 11. Although not illustrated in FIG. 1, leveling layers are formed in the ceramic body 3, extending in the same plane as the individual inner electrodes 4 and 5.

The inner-electrode printed film 11 and the leveling printed film 12 are formed through inkjet printing using an ink according to this invention. Details are described in a later part.

Then multiple ceramic green sheets 10 are stacked to form a green multilayer body. This green multilayer body is fired, with or without prior compression and cutting. As a result of firing, the ceramic body 3 illustrated in FIG. 1, containing the inner electrodes 4 and 5, is obtained. The outer electrodes 6 and 7 are formed on the end portions of this ceramic body 3, completing the multilayer ceramic capacitor 1.

As mentioned above, an inkjet ink according to this invention is characterized in that the inkjet ink contains a functional particle having an average particle diameter of 50 to 1000 nm, a rheology-controlling particle having an average particle diameter of 4 to 40 nm, and an organic vehicle, and is also characterized by a viscosity of 1 to 50 mPa·s at a shear rate of 1000 s$^{-1}$ and a viscosity at a shear rate of 0.1 s$^{-1}$ equal to or higher than a viscosity η calculated using $$\eta = (D)^2 \times \rho/10^4/2 + 80 \qquad \text{Equation 1}$$

[where η is the viscosity (mPa·s) at a shear rate of 0.1 s$^{-1}$, D is the average particle diameter (nm) of the functional particle, and ρ is the specific gravity of the functional particle].

A rheology-controlling particle having an average particle diameter of 4 to 40 nm has a very large specific surface area.

Thus a large interaction works between such particles. Adding such a rheology-controlling particle to the ink leads to effective formation of a three-dimensional network structure that involves the large-diameter functional particle, which has a particle diameter of 50 nm or more, and the rheology-controlling particle. This network structure ensures that at a high shear rate the ink has low-viscosity characteristics that allow for inkjet printing (1 to 50 mPa·s at a shear rate of 1000 s$^{-1}$) and at a low shear rate the ink has high-viscosity characteristics that provide a sufficient inhibitory effect on the sedimentation of the functional particle having an average particle diameter of 50 to 1000 nm and an anti-bleeding effect (a viscosity at a shear rate of 0.1 s$^{-1}$ equal to or higher than η calculated using Equation 1 above).

For this rheology-controlling effect of the rheology-controlling particle to be enhanced, the amount of addition of the rheology-controlling particle is preferably in the range of 3.0 to 42.4 parts by volume per 100 parts by volume of the functional particle.

Because of such effects, an inkjet ink according to this invention has all of three characteristics consisting of viscosity characteristics that allow for inkjet printing, sedimentation characteristics that ensure stable printing, and the nature of being unlikely to bleed after printing.

The following discusses Stokes' law mentioned above again:

$$vs=\{Dp^2(\rho p-\rho f)g\}/18\eta$$

(where vs is the rate of sedimentation of the particle, Dp is the diameter of the particle, ρp is the specific gravity of the particle, ρf is the specific gravity of the dispersion medium, g is the gravitational acceleration, and η is the viscosity of the dispersion medium).

As mentioned above, Stokes' law indicates that in an organic ink in which a particle having a particle diameter of 50 nm or more is dispersed, increasing the viscosity η of the dispersion medium effectively reduces troublesome sedimentation of the particle.

In this invention, this η is increased through the use of a three-dimensional network structure that involves a large-diameter particle having a particle diameter of 50 nm or more and a fine particle as described above. This three-dimensional network structure features its reversible formation and disintegration that occur in response to varying shear force. With decreasing diameter of the fine particle, the specific surface area increases, the number of particles per total added volume increases, and at the same time the interparticle distance becomes narrower. Thus the smaller the particle diameter of the fine particle is, the more effectively the three-dimensional network structure is formed.

In more specific terms, when the ink is static or at a low shear rate, sedimentation is reduced because the formation of the three-dimensional network structure that involves a large-diameter particle and a fine particle increases η (i.e., viscosity develops at the particle interface and in a space). At a moment of inkjet printing, at which a high shear force is applied, the disintegration of the three-dimensional network structure reduces η, making it possible to apply the ink by inkjet printing. In the applied ink, furthermore, a high η achieved through the recovery of the three-dimensional network structure provides an inhibitory effect on the bleeding of dots and printed graphics.

It is generally known that the use of a thixotropic agent also results in characteristics similar to the above. Thixotropic agents, however, are not suitable for inkjet printing because they trigger the formation of a three-dimensional network structure of swollen resin (development of viscosity in a space) and cause the ink to insufficiently lose its viscosity upon the disintegration of the three-dimensional network structure at a high shear force.

Furthermore, thixotropy can be easily induced in an aqueous system like the one described in Patent Document 4 above because of high polarity and high surface tension, but not in an organic solvent system, which has low polarity and low surface tension. Therefore applying a design of aqueous paste like the one described in Patent Document 4, for example, to an organic solvent system would fail to induce required thixotropy.

Inducing sufficient thixotropy in an organic solvent system requires at least adding a fine particle having a particle diameter of 40 nm or less as with an inkjet ink according to this invention. This is because making a particle finer increases the number of particles and accordingly shortens the inter-surface distance between particles and increases the surface area of the particle, thereby helping a three-dimensional network structure that involves the fine particle to form. This effect becomes more significant with decreasing particle diameter.

In an inkjet ink according to this invention, the functional particle is made of, for example, a conductor, a resistor, a dielectric, a magnetic substance, or a phosphor. The functional particle refers to a particle made of any material that provides an electromagnetic or optical function, and can be a particle made of a mixture of multiple materials or a mixture of particles made of different materials. Whatever the concentration of the functional particle in the ink, ensuring that the viscosity at a shear rate of 0.1 s$^{-1}$ is equal to or higher than η calculated using Equation 1 above provides sufficient anti-sedimentation and anti-bleeding effects.

The rheology-controlling particle is defined only by its particle diameter. The rheology-controlling particle can therefore be made of any material. Preferably, the rheology-controlling particle is composed of a ceramic material (an oxide, a nitride, a boride, a silicide, or a carbide).

Materials for an organic solvent and a binder that constitute the organic vehicle are not limited. Each of these constituents can be a mixture of multiple materials. As the organic solvent, for example, at least one selected from alcohol-based, ester-based, ketone-based, and ether-based solvents can be suitably used. As the binder, at least one selected from cellulose-based, acrylic, and cyclic-acetal-based binders can be suitably used.

In the inkjet ink for forming the inner-electrode printed film 11 illustrated in FIG. 2, the functional particle is an electroconductive particle made of a metal or any similar material. When the functional particle is made of a material having a relatively low melting point, such as a metal, and when the rheology-controlling particle is made of a ceramic material, the rheology-controlling particle has a sufficient anti-necking effect on the functional particle having an average particle diameter of 50 nm or more, making the inner-electrode printed film 11 start heat-shrinking at a higher temperature when fired. This reduces the differential shrinkage between the ceramic green sheets 10 and the inner-electrode printed film 11 and allows the user to produce a multilayer ceramic capacitor 1 with few structural defects. In this case, it is more preferred that the rheology-controlling particle be based on the same main component as the ceramic body 3.

The electroconductive particle is preferably made of at least one metal selected from the group consisting of Au, Pt, Ag, Ni, Cu, Al, and Fe or an alloy containing at least one metal selected from this group. These metals are suitable for use as materials for an electrode in a ceramic electronic component such as the multilayer ceramic capacitor 1.

In the inkjet ink for forming the leveling printed film 12 illustrated in FIG. 2, the functional particle is a ceramic particle. Ensuring that the ceramic particle to serve as the functional particle is based on the same main component as the ceramic layers 2, i.e., the same main component as the ceramic particle contained in the ceramic green sheets 10, and that the rheology-controlling particle is made of a ceramic material makes the ink more suitable for the formation of the leveling printed film 12.

In the above case, ensuring that the average particle diameter of the functional particle is in the range of 48% to 152% of the pre-firing average particle diameter of the ceramic particle that is the main component of the ceramic layers 2 further reduces the shrinkage mismatch that occurs between the ceramic green sheets 10 and the leveling printed film 12 during firing, thereby providing an inkjet ink that has heat shrinkage characteristics that make the resulting multilayer ceramic capacitor 1 less likely to have structural defects.

Although the foregoing describes a case where an inkjet ink according to this invention is for use in a multilayer ceramic capacitor 1 and is used to form both an inner-electrode printed film 11 to serve as inner electrodes 4 and 5 and a leveling printed film 12 to serve as a leveling layer, an inkjet ink according to this invention may also be used to form only one of the inner-electrode printed film 11 and the leveling printed film 12.

Furthermore, the applications of an inkjet ink according to this invention are not limited to a multilayer ceramic capacitor 1 and include other multilayer ceramic electronic components and even non-multilayer ceramic electronic components. An inkjet ink according to this invention may also be used in fields other than electronic components.

A typical form of inkjet that can be performed using an ink according to this invention is piezoelectric inkjet, but this is not the only possible form. An inkjet ink according to this invention can be applied to any form of inkjet printing that requires a low-viscosity ink.

The following describes some experiment examples performed on the basis of this invention.

Experiment Example 1

<Production of Inkjet Inks>

As presented in Table 1, nickel powders having an average particle diameter ("average particle diameter" means "BET-equivalent average particle diameter"; the same applies hereinafter) of 10 nm, 50 nm, 100 nm, 500 nm, 1000 nm, and 2000 nm were provided as functional particles, and barium titanate powders having an average particle diameter of 4 nm, 10 nm, 30 nm, 40 nm, and 60 nm were provided as rheology-controlling particles.

For samples 1 to 6, a mixture of 35 parts by weight of a functional particle having the average particle diameter indicated in the "Average functional particle diameter" column in Table 1, five parts by weight of a polymer-based dispersant, and 60 parts by weight of an organic vehicle composed of ethyl cellulose resin and dihydro-terpineol acetate was processed in a pot mill to yield an inkjet ink.

As for samples 7 to 32, a mixture of 35 parts by weight of a functional particle having the average particle diameter indicated in the "Average functional particle diameter" column in Table 1, five parts by weight of a rheology-controlling particle having the average particle diameter indicated in the "Average rheology-controlling particle diameter" column in Table 1, four parts by weight of a polymer-based dispersant, and 56 parts by weight of an organic vehicle composed of ethyl cellulose resin and dihydro-terpineol acetate was processed in a pot mill to yield an inkjet ink.

<Rheological Evaluation>

The inkjet inks according to samples 1 to 32 thus obtained were subjected to the measurement of their viscosity after 3 seconds at a shear rate of $1000$ s$^{-1}$ and their viscosity after 5 seconds at a shear rate of $0.1$ s$^{-1}$ using an Anton-Paar cone rheometer (MCR300). The respective results are presented in the "Viscosity at $1000$ s$^{-1}$" and "Viscosity at $0.1$ s$^{-1}$" columns in Table 1.

The cone used with the cone rheometer was one having a diameter of 75 mm (CP 75). The temperature condition was 25° C.±2° C.

In addition, the "Viscosity according to Equation 1" column in Table 1 indicates the viscosity $\eta$ calculated using Equation 1 above. The specific gravity of the nickel powders as the functional particles was assumed to be 8.9.

<Evaluation of Sedimentability>

The sedimentability of the obtained inkjet inks according to the individual samples was evaluated through a 4-hour continuous printing with these inks using a piezoelectric inkjet printer. If the thickness of the resulting printed film was in a margin of target thickness 1.0 μm±5%, the sample was marked "⊙" in the "Sedimentability" column in Table 1. If the thickness exceeded a margin of 1.0 μm±5% but fell within 1.0 μm±10%, the sample was marked "○" in the "Sedimentability" column. If the thickness exceeded a margin of 1.0 μm±10% but fell within 1.0 μm±20%, the sample was marked "Δ" in the "Sedimentability" column. If the thickness exceeded a margin of 1.0 μm±20% or if the nozzle clogged during printing, the sample was marked "x" in the "Sedimentability" column.

<Evaluation of Printing Bleeds>

The bleeding of the obtained inkjet inks according to the individual samples was evaluated through the printing of 500 dots having an average diameter of 70 μm on a ceramic green sheet using a piezoelectric inkjet printer with these inks and the assessment of the roundness of each dot and dot diameters using NEXIV-VMR-6555 (Nikon). If the average roundness of the dots/the average dot diameter was less than 15%, the sample was marked "⊙" in the "Printing bleeds" column in Table 1. If this ratio was in the range of 15% to 20%, the sample was marked "○" in the "Printing bleeds" column. If this ratio was not in the range of 20% or less, the sample was marked "x" in the "Printing bleeds" column.

Note that the roundness is a value calculated in accordance with "JIS B 0621-1984." If this value is 0, the dot can be deemed as a perfect circle with no bleeds.

<Evaluation of Structural Defects>

Through the following procedure, ceramic bodies for a multilayer ceramic capacitor were produced using the inkjet inks according to the individual samples, and the obtained ceramic bodies were evaluated for structural defects.

A mixture of predetermined proportions of a barium-titanate-based ceramic material, an organic binder, an organic solvent, a plasticizer, and a dispersant was made into a ceramic slurry through wet dispersion using a ball mill.

This ceramic slurry was shaped on a PET (polyethylene terephthalate) film using the doctor blade method in such a manner that its dry thickness was 6.0 μm, yielding a ceramic green sheet.

Then the inkjet ink according to each sample was applied to the ceramic green sheet using a piezoelectric inkjet printer to form a printed film that should serve as an inner electrode. The printed film was formed in such a manner that its dry thickness was 1.0 μm, drawing a pattern such that the later-obtained cut and fired chips of the ceramic body had flat dimensions of 2.0 mm×1.2 mm.

Then 200 ceramic green sheets having this inner-electrode printed film were removed from the PET film and stacked, and this stack was compressed in a predetermined mold.

This compressed block of a multilayer body was cut into a predetermined size, yielding chips of a raw multilayer body that should serve as main components for separate multilayer ceramic capacitors.

After a 10-hour degreasing in nitrogen at a temperature of 350° C., this raw multilayer body was fired through a profile in which the multilayer body was maintained in a $N_2/H_2/H_2O$ mixed atmosphere at a temperature of 1200° C. for 2 hours with the oxygen partial pressure at $10^{-6}$ to $10^{-7}$ MPa.

The appearance of each fired main component, i.e., a ceramic body containing an inner electrode, was observed for the assessment of structural defects such as delamination and cracks. One hundred main components were produced for each sample, and if the number of components with any structural defect was one or less, the sample was marked "○" in the "Structural defects" column in Table 1. If the number of components with any structural defect was two or more, the sample was marked "x" in the "Structural defects" column.

Referring to the "Viscosity at 1000 $s^{-1}$" column in Table 1, all samples fell within the viscosity range of 1 to 50 mPa·s. This indicates that all samples fell within a viscosity range where the ink could be applied using an ordinary inkjet apparatus.

Next, "sedimentability" is discussed.

Focusing on samples 1 to 6, which contained no rheology-controlling particle, the "sedimentability" was "x" or "Δ" for samples 2 to 6, which had an "average functional particle diameter" of 50 nm or more.

Turning to samples 7 to 32, which contained a rheology-controlling particle, samples 7 to 11, 13 to 16, 18 to 20, and 23 to 25 had a "viscosity at 0.1 $s^{-1}$" higher than the "viscosity according to Equation 1" and an "average rheology-controlling particle diameter" of 4 to 40 nm. The "sedimentability" of these samples, i.e., samples 7 to 11, 13 to 16, 18 to 20, and 23 to 25, was "○" or "⊙." Focusing on these samples, i.e., samples 7 to 11, 13 to 16, 18 to 20, and 23 to 25, the "sedimentability" of samples 7 to 11, 13 to 16, and 18 to 20 in particular, which had an "average rheology-controlling particle diameter" of 30 nm or less, was "⊙."

On the other hand, the "sedimentability" of samples 28 and 29, which had a "viscosity at 0.1 $s^{-1}$" higher than the "viscosity according to Equation 1" but had an "average rheology-controlling particle diameter" of 60 nm, was "Δ" or "x."

Next, "printing bleeds" is discussed.

Focusing on samples 1 to 6, which contained no rheology-controlling particle, the "printing bleeds" was "x" for samples 2 to 6, which had an "average functional particle diameter" of 50 nm or more.

Turning to samples 7 to 32, which contained a rheology-controlling particle, the "printing bleeds" was "○" or "⊙"

TABLE 1

| Sample No. | Average functional particle diameter (nm) | Average rheology-controlling particle diameter (nm) | Viscosity at 1000 $s^{-1}$ (mPa·s) | Viscosity at 0.1 $s^{-1}$ (mPa·s) | Viscosity according to Equation 1 (mPa·s) | Sedimentability | Printing bleeds | Structural defects |
|---|---|---|---|---|---|---|---|---|
| 1 | 10 | — | 35 | 592 | 80 | ⊙ | ○ | X |
| 2 | 50 | — | 32 | 267 | 81 | Δ | X | X |
| 3 | 100 | — | 29 | 176 | 84 | X | X | X |
| 4 | 500 | — | 26 | 85 | 191 | X | X | X |
| 5 | 1000 | — | 21 | 58 | 525 | X | X | X |
| 6 | 2000 | — | 23 | 43 | 1860 | X | X | ○ |
| 7 | 10 | 4 | 46 | 1642 | 80 | ⊙ | ⊙ | ○ |
| 8 | 50 | 4 | 43 | 1039 | 81 | ⊙ | ⊙ | ○ |
| 9 | 100 | 4 | 30 | 962 | 84 | ⊙ | ⊙ | ○ |
| 10 | 500 | 4 | 27 | 868 | 191 | ⊙ | ⊙ | ○ |
| 11 | 1000 | 4 | 24 | 808 | 525 | ⊙ | ⊙ | ○ |
| 12 | 2000 | 4 | 24 | 778 | 1860 | X | X | ○ |
| 13 | 50 | 10 | 34 | 788 | 81 | ⊙ | ⊙ | ○ |
| 14 | 100 | 10 | 30 | 665 | 84 | ⊙ | ⊙ | ○ |
| 15 | 500 | 10 | 30 | 548 | 191 | ⊙ | ⊙ | ○ |
| 16 | 1000 | 10 | 24 | 531 | 525 | ⊙ | ⊙ | ○ |
| 17 | 2000 | 10 | 24 | 523 | 1860 | X | X | ○ |
| 18 | 50 | 30 | 33 | 513 | 81 | ⊙ | ⊙ | ○ |
| 19 | 100 | 30 | 29 | 378 | 84 | ⊙ | ⊙ | ○ |
| 20 | 500 | 30 | 26 | 273 | 191 | ⊙ | ⊙ | ○ |
| 21 | 1000 | 30 | 22 | 248 | 525 | X | X | ○ |
| 22 | 2000 | 30 | 21 | 242 | 1860 | X | X | ○ |
| 23 | 50 | 40 | 35 | 495 | 81 | ○ | ○ | ○ |
| 24 | 100 | 40 | 29 | 365 | 84 | ○ | ○ | ○ |
| 25 | 500 | 40 | 26 | 238 | 191 | ○ | ○ | ○ |
| 26 | 1000 | 40 | 21 | 225 | 525 | X | X | ○ |
| 27 | 2000 | 40 | 20 | 211 | 1860 | X | X | ○ |
| 28 | 50 | 60 | 35 | 270 | 81 | Δ | X | X |
| 29 | 100 | 60 | 31 | 197 | 84 | X | X | ○ |
| 30 | 500 | 60 | 23 | 125 | 191 | X | X | ○ |
| 31 | 1000 | 60 | 21 | 106 | 525 | X | X | ○ |
| 32 | 2000 | 60 | 20 | 95 | 1860 | X | X | ○ | for samples 7 to 11, 13 to 16, 18 to 20, and 23 to 25, which had a "viscosity at 0.1 s$^{-1}$" higher than the "viscosity according to Equation 1" and an "average rheology-controlling particle diameter" of 4 to 40 nm. Focusing on these samples, i.e., samples 7 to 11, 13 to 16, 18 to 20, and 23 to 25, the "printing bleeds" of samples 7 to 11, 13 to 16, and 18 to 20 in particular, which had an "average rheology-controlling particle diameter" of 30 nm or less, was "⊙."

On the other hand, the "printing bleeds" of samples 28 and 29, which had a "viscosity at 0.1 s$^{-1}$" higher than the "viscosity according to Equation 1" but had an "average rheology-controlling particle diameter" of 60 nm, was "x."

As can be seen from these results of the evaluation of "sedimentability" and "printing bleeds," the anti-sedimentation and anti-bleeding effects become more significant with decreasing "average rheology-controlling particle diameter," and effective inhibition of sedimentation and printing bleeds require that the "average rheology-controlling particle diameter" be 40 nm or less, preferably 30 nm or less.

Next, "structural defects" is discussed.

Focusing on samples 1 to 6, which contained no rheology-controlling particle, the "structural defects" was "x" for samples 1 to 5, which had an "average functional particle diameter of 1000 nm or less. This appears to be because the heat shrinkage temperature decreased with decreasing diameter of the functional particle.

Turning to samples 7 to 32, which contained a rheology-controlling particle, the "structural defects" was "x" only for sample 28, which had a relatively large "average rheology-controlling particle diameter" of 60 nm and an extremely small "average functional particle diameter" of 50 nm. As for the other samples, i.e., samples 7 to 27 and 29 to 32, which met the condition stipulating that the "average rheology-controlling particle diameter" had to be smaller than the "average functional particle diameter," the "structural defects" was "○."

This indicates that when a functional particle having an "average functional particle diameter" of 50 nm or more is used, adding a rheology-controlling particle having an average diameter smaller than that of this functional particle is effective in reducing structural defects occurring in the multilayer ceramic electronic component.

Then the inks according to samples 8, 10, 14, 15, 19, 20, and 25 were made into dry coatings, and their surface was observed using FE-SEM (JSM-7000F, JEOL Ltd.), identifying a morphology in which rheology-controlling particles (barium titanate particles) were evenly held near the surface of a functional particle (a Ni particle). This morphology of the coating surface suggests that in the ink, rheology-controlling particles are uniformly arranged near a functional particle. This appears to be the reason for the high anti-sedimentation, anti-bleeding, and anti-sintering effects.

Experiment Example 2

<Production of Inkjet Inks>

The inkjet ink according to sample 4, produced in Experiment Example 1, was provided.

As presented in Table 2, a nickel powder having an average particle diameter of 500 nm was provided as a functional particle, and barium titanate particles having an average particle diameter of 4 nm and 30 nm were provided as rheology-controlling particles.

For samples 33 to 38, a mixture of 35 parts by weight of the functional particle, 0.8 to 10.0 parts by weight of a rheology-controlling particle, 5 parts by weight of a polymer-based dispersant, and 50.0 to 56.2 parts by weight of an organic vehicle composed of ethyl cellulose resin and dihydro-terpineol acetate was processed in a pot mill to yield an inkjet ink. As presented in the "Rheology-controlling particle/functional particle volume ratio" column in Table 2, the composition of these samples, i.e., samples 33 to 38, was one ensuring that the rheology-controlling particle corresponded to 3.0 to 42.4 parts by volume of per 100 parts by volume of the functional particle.

<Rheological Evaluation>

The "viscosity at 1000 s$^{-1}$" and "viscosity at 0.1 s$^{-1}$" in Table 2 were determined in the same way as in Experiment Example 1. The "viscosity according to Equation 1" was also calculated.

<Evaluation of Sedimentability>

The "sedimentability" in Table 2 was evaluated in the same way as in Experiment Example 1 and presented in the same way.

<Evaluation of Printing Bleeds>

The "printing bleeds" in Table 2 was evaluated in the same way as in Experiment Example 1 and presented in the same way.

<Evaluation of Structural Defects>

The "structural defects" in Table 2 was evaluated in the same way as in Experiment Example 1 and presented in the same way.

TABLE 2

| Sample No. | Average functional particle diameter (nm) | Average rheology-controlling particle diameter (nm) | Rheology-controlling particle/functional particle volume ratio | Viscosity at 1000 s$^{-1}$ (mPa · s) | Viscosity at 0.1 s$^{-1}$ (mPa · s) | Viscosity according to Equation 1 (mPa · s) | Sedimentability | Printing bleeds | Structural defects |
|---|---|---|---|---|---|---|---|---|---|
| 4 | 500 | — | 0/100 | 26 | 85 | 191 | X | X | X |
| 33 | 500 | 4 | 3/100 | 25 | 441 | 191 | ⊙ | ⊙ | ○ |
| 34 | 500 | 4 | 14.8/100 | 24 | 751 | 191 | ⊙ | ⊙ | ○ |
| 35 | 500 | 4 | 42.4/100 | 23 | 1274 | 191 | ⊙ | ⊙ | ○ |
| 36 | 500 | 30 | 3/100 | 22 | 207 | 191 | ⊙ | ⊙ | ○ |
| 37 | 500 | 30 | 14.8/100 | 28 | 294 | 191 | ⊙ | ⊙ | ○ |
| 38 | 500 | 30 | 42.4/100 | 26 | 478 | 191 | ⊙ | ⊙ | ○ |

Referring to Table 2, "sedimentability" and "printing bleeds" are discussed.

Samples 33 to 38, containing a rheology-controlling particle, had a "viscosity at 0.1 s$^{-1}$" higher than the "viscosity according to Equation 1" and an "average rheology-controlling particle diameter" of 30 nm or less. The "sedimentability" and "printing bleeds" of these samples, i.e., samples 33 to 38, were "⊙."

On the other hand, as mentioned above, the "sedimentability" and "printing bleeds" were "x" for sample 4, which contained no rheology-controlling particle.

Next, "structural defects" is discussed.

As mentioned above, the "structural defects" of sample 4, which contained no rheology-controlling particle, was "x."

On the other hand, the "structural defects" of samples 33 to 38, which contained a rheology-controlling particle and had a "rheology-controlling particle/functional particle diameter volume ratio" in the range of 3.0/100 to 42.4/100, was "○."

This indicates that an excellent inhibitory effect on structural defects is obtained when the "rheology-controlling particle/functional particle volume ratio" at least falls within the range of 3.0/100 to 42.4/100. Making the "rheology-controlling particle/functional particle volume ratio" more than 42.4/100 does not spoil the inhibitory effect on structural defects, but is not preferred because this leads to too small an effective area for use as an inner electrode.

Experiment Example 3

<Production of Inkjet Inks>

In Experiment Example 3, inkjet inks were produced whose functional particles were electroconductive particles composed of different metal species as presented in the "Functional particle" column in Table 3. The following describes how the inkjet ink according to each sample in Table 3 was produced.

The inkjet ink according to sample 39 was obtained through pot-mill processing of a mixture of 40 parts by weight of a functional particle that was a Ni powder having an average particle diameter of 500 nm, 4 parts by weight of a rheology-controlling particle that was a barium titanate powder having an average particle diameter of 10 nm, 5 parts by weight of a polymer-based dispersant, and 51 parts by weight of an organic vehicle composed of ethyl cellulose resin and dihydro-terpineol acetate.

The inkjet ink according to sample 40 was obtained through pot-mill processing of a mixture of 40 parts by weight of a functional particle that was a Cu powder having an average particle diameter of 500 nm, 4 parts by weight of a rheology-controlling particle that was a barium titanate powder having an average particle diameter of 10 nm, 5 parts by weight of a polymer-based dispersant, and 51 parts by weight of an organic vehicle composed of ethyl cellulose resin and dihydro-terpineol acetate.

The inkjet ink according to sample 41 was obtained through pot-mill processing of a mixture of 44 parts by weight of a functional particle that was a Ag powder having an average particle diameter of 500 nm, 3.7 parts by weight of a rheology-controlling particle that was a barium titanate powder having an average particle diameter of 10 nm, 4.7 parts by weight of a polymer-based dispersant, and 46.6 parts by weight of an organic vehicle composed of ethyl cellulose resin and dihydro-terpineol acetate.

The inkjet ink according to sample 42 was obtained through pot-mill processing of a mixture of 59 parts by weight of a functional particle that was a Au powder having an average particle diameter of 500 nm, 2.7 parts by weight of a rheology-controlling particle that was a barium titanate powder having an average particle diameter of 10 nm, 3.3 parts by weight of a polymer-based dispersant, and 35 parts by weight of an organic vehicle composed of ethyl cellulose resin and dihydro-terpineol acetate.

The inkjet ink according to sample 43 was obtained through pot-mill processing of a mixture of 62 parts by weight of a functional particle that was a Pt powder having an average particle diameter of 500 nm, 2.6 parts by weight of a rheology-controlling particle that was a barium titanate powder having an average particle diameter of 10 nm, 3.2 parts by weight of a polymer-based dispersant, and 32 parts by weight of an organic vehicle composed of ethyl cellulose resin and dihydro-terpineol acetate.

The inkjet ink according to sample 44 was obtained through pot-mill processing of a mixture of 17 parts by weight of a functional particle that was an Al powder having an average particle diameter of 500 nm, 5.5 parts by weight of a rheology-controlling particle that was a barium titanate powder having an average particle diameter of 10 nm, 6.9 parts by weight of a polymer-based dispersant, and 69.3 parts by weight of an organic vehicle composed of ethyl cellulose resin and dihydro-terpineol acetate.

The inkjet ink according to sample 45 was obtained through pot-mill processing of a mixture of 37 parts by weight of a functional particle that was an Fe powder having an average particle diameter of 500 nm, 4.2 parts by weight of a rheology-controlling particle that was a barium titanate powder having an average particle diameter of 10 nm, 5.2 parts by weight of a polymer-based dispersant, and 52.4 parts by weight of an organic vehicle composed of ethyl cellulose resin and dihydro-terpineol acetate.

The composition of these samples, i.e., samples 39 to 45, was one ensuring that the "rheology-controlling particle/functional particle volume ratio" corresponded to 11/100.

<Rheological Evaluation>

The "viscosity at 1000 $s^{-1}$" and "viscosity at 0.1 $s^{-1}$" in Table 3 were determined in the same way as in Experiment Example 1. The "viscosity according to Equation 1" was also calculated.

In the calculations of the "viscosity according to Equation 1" in Table 1, as mentioned above, the specific gravity of the functional particle was assumed to be 8.9 for the Ni powder. The specific gravity was assumed to be 8.9 for the Cu powder, 10.5 for the Ag powder, 19.3 for the Au powder, 21.5 for the Pt powder, 2.7 for the Al powder, and 7.9 for the Fe powder.

<Evaluation of Sedimentability>

The "sedimentability" in Table 3 was evaluated in the same way as in Experiment Example 1 and presented in the same way.

<Evaluation of Printing Bleeds>

The "printing bleeds" in Table 3 was evaluated in the same way as in Experiment Example 1 and presented in the same way.

<Evaluation of Structural Defects>

The "structural defects" in Table 3 was evaluated in the same way as in Experiment Example 1 and presented in the same way.

TABLE 3

| Sample No. | Functional paricle | Average functional particle diameter (nm) | Average rheology-controlling particle diameter (nm) | Viscosity at 1000 s$^{-1}$ (mPa·s) | Viscosity at 0.1 s$^{-1}$ (mPa·s) | Viscosity according to Equation 1 (mPa·s) | Sedimentability | Printing bleeds | Structural defects |
|---|---|---|---|---|---|---|---|---|---|
| 39 | Ni | 500 | 10 | 23 | 738 | 223 | ⊙ | ⊙ | ○ |
| 40 | Cu | 500 | 10 | 20 | 658 | 223 | ⊙ | ⊙ | ○ |
| 41 | Ag | 500 | 10 | 30 | 527 | 263 | ⊙ | ⊙ | ○ |
| 42 | Au | 500 | 10 | 20 | 511 | 483 | ○ | ○ | ○ |
| 43 | Pt | 500 | 10 | 28 | 629 | 536 | ○ | ○ | ○ |
| 44 | Al | 500 | 10 | 22 | 502 | 68 | ⊙ | ⊙ | ○ |
| 45 | Fe | 500 | 10 | 24 | 594 | 198 | ⊙ | ⊙ | ○ |

Referring to Table 3, "sedimentability" and "printing bleeds" are discussed.

Samples 39 to 45 had a "viscosity at 0.1 s$^{-1}$" higher than the "viscosity according to Equation 1" and an "average rheology-controlling particle diameter" of 10 nm. The "sedimentability" and "printing bleeds" of these samples, i.e., samples 39 to 45, were "○" or "⊙."

These results and the results of Experiment Example 1 indicate that whatever the specific gravity of the functional particle, sufficient anti-sedimentation and anti-bleeding effects are obtained when the "viscosity at 0.1 s$^{-1}$" is higher than the "viscosity according to Equation 1" and at the same time the "average rheology-controlling particle diameter" is 40 nm or less.

Next, "structural defects" is discussed.

The "structural defects" of samples 39 to 45, which had a "rheology-controlling particle/functional particle volume ratio" of 11/100 as mentioned above, was "○."

These results and the results of Experiment Example 2 indicate that whatever the specific gravity of the functional particle, an excellent inhibitory effect on structural defects is obtained when the "rheology-controlling particle/functional particle volume ratio" at least falls within the range of 3.0/100 to 42.4/100.

Experiment Example 4

<Production of Inkjet Inks>

In Experiment Example 4, inkjet inks were produced whose organic vehicles contained different binder resins as presented in the "Binder" column in Table 4. The following describes how the inkjet ink according to each sample in Table 4 was produced.

The inkjet ink according to sample 46 was obtained through pot-mill processing of a mixture of 25 parts by weight of a functional particle that was a nickel powder having an average particle diameter of 300 nm, 4 parts by weight of a rheology-controlling particle that was a barium titanate powder having an average particle diameter of 10 nm, 5 parts by weight of a polymer-based dispersant, and 66 parts by weight of an organic vehicle composed of ethyl cellulose resin and dihydro-terpineol acetate.

The inkjet ink according to sample 47 was obtained through pot-mill processing of a mixture of 25 parts by weight of a functional particle that was a nickel powder having an average particle diameter of 300 nm, 4 parts by weight of a rheology-controlling particle that was a barium titanate powder having an average particle diameter of 10 nm, 5 parts by weight of a polymer-based dispersant, and 66 parts by weight of an organic vehicle composed of acrylic resin and dihydro-terpineol acetate. The acrylic resin contained ethyl methacrylate, t-butyl methacrylate, and acrylic acid as monomer units.

The inkjet ink according to sample 48 was obtained through pot-mill processing of a mixture of 25 parts by weight of a functional particle that was a nickel powder having an average particle diameter of 300 nm, 4 parts by weight of a rheology-controlling particle that was a barium titanate powder having an average particle diameter of 10 nm, 5 parts by weight of a polymer-based dispersant, and 66 parts by weight of an organic vehicle composed of polyvinyl butyral resin (a cyclic-acetal-based resin) and dihydro-terpineol acetate.

The composition of these samples, i.e., samples 46 to 48, was one ensuring that the "rheology-controlling particle/functional particle volume ratio" corresponded to 11/100.

<Rheological Evaluation>

The "viscosity at 1000 s$^{-1}$" and "viscosity at 0.1 s$^{-1}$" in Table 4 were determined in the same way as in Experiment Example 1. The "viscosity according to Equation 1" was also calculated.

<Evaluation of Sedimentability>

The "sedimentability" in Table 4 was evaluated in the same way as in Experiment Example 1 and presented in the same way.

<Evaluation of Printing Bleeds>

The "printing bleeds" in Table 4 was evaluated in the same way as in Experiment Example 1 and presented in the same way.

<Evaluation of Structural Defects>

The "structural defects" in Table 4 was evaluated in the same way as in Experiment Example 1 and presented in the same way.

TABLE 4

| Sample No. | Binder | Average functional particle diameter (nm) | Average rheology-controlling particle diameter (nm) | Viscosity at 1000 s$^{-1}$ (mPa · s) | Viscosity at 0.1 s$^{-1}$ (mPa · s) | Viscosity according to Equation 1 (mPa · s) | Sedimentability | Printing bleeds | Structural defects |
|---|---|---|---|---|---|---|---|---|---|
| 46 | Ethyl cellulose resin | 300 | 15 | 16 | 211 | 120 | ⊙ | ⊙ | ○ |
| 47 | Acrylic resin | 300 | 15 | 13 | 168 | 120 | ⊙ | ⊙ | ○ |
| 48 | Polyvinyl butyral resin | 300 | 15 | 19 | 207 | 120 | ⊙ | ⊙ | ○ |

Referring to Table 4, "sedimentability" and "printing bleeds" are discussed.

Samples 46 to 48 had a "viscosity at 0.1 s$^{-1}$" higher than the "viscosity according to Equation 1" and an "average rheology-controlling particle diameter" of 15 nm. The "sedimentability" and "printing bleeds" of these samples, i.e., samples 46 to 48, were "⊙."

These results and the results of Experiment Example 1 indicate that with any kind of binder resin, sufficient anti-sedimentation and anti-bleeding effects are obtained when the "viscosity at 0.1 s$^{-1}$" is higher than the "viscosity according to Equation 1" and at the same time the "average rheology-controlling particle diameter" is 40 nm or less. In addition to this, these effects are satisfactorily obtained even with a mixture of multiple binder resins, rather than a single binder resin.

Next, "structural defects" is discussed.

The "structural defects" of samples 46 to 48, which had a "rheology-controlling particle/functional particle volume ratio" of 11/100 as mentioned above, was "○."

These results and the results of Experiment Example 2 indicate that with any kind of binder resin, an excellent inhibitory effect on structural defects is obtained when the "rheology-controlling particle/functional particle volume ratio" at least falls within the range of 3.0/100 to 42.4/100. In addition to this, this effect is satisfactorily obtained even with a mixture of multiple binder resins, rather than a single binder resin.

Experiment Example 5

<Production of Inkjet Inks>

As presented in Table 5, barium titanate powders having an average particle diameter of 10 nm, 50 nm, 100 nm, 250 nm, 400 nm, and 500 nm were provided as functional particles, and a barium titanate powder having an average particle diameter of 10 nm was provided as a rheology-controlling particle.

For samples 49 to 54, a mixture of 26 parts by weight of a functional particle having the average particle diameter indicated in the "Average functional particle diameter" column in Table 5, five parts by weight of a polymer-based dispersant, and 69 parts by weight of an organic vehicle composed of ethyl cellulose resin and dihydro-terpineol acetate was processed in a high-pressure homogenizer to yield an inkjet ink.

Turning to samples 55 to 60, a mixture of 25 parts by weight of a functional particle having the average particle diameter indicated in the "Average functional particle diameter" column in Table 5, four parts by weight of a rheology-controlling particle having the average particle diameter indicated in the "Average rheology-controlling particle diameter" column in Table 5, five parts by weight of a polymer-based dispersant, and 60 parts by weight of an organic vehicle composed of ethyl cellulose resin and dihydro-terpineol acetate was processed in a high-pressure homogenizer to yield an inkjet ink.

<Rheological Evaluation>

The "viscosity at 1000 s$^{-1}$" and "viscosity at 0.1 s$^{-1}$" in Table 5 were determined in the same way as in Experiment Example 1. The "viscosity according to Equation 1" was also calculated.

In the calculations of the "viscosity according to Equation 1" in Table 5, the specific gravity of the barium titanate particle used as the functional particle was assumed to be 6.0.

<Evaluation of Sedimentability>

The "sedimentability" in Table 5 was evaluated in the same way as in Experiment Example 1 and presented in the same way.

<Evaluation of Printing Bleeds>

The "printing bleeds" in Table 5 was evaluated in the same way as in Experiment Example 1 and presented in the same way.

<Evaluation of Structural Defects>

For the evaluation of the "structural defects" in Table 5, sample ceramic bodies for a multilayer ceramic capacitor were produced in the same way as in Experiment Example 1, except for some differences in the production method.

A mixture of predetermined proportions of a barium-titanate-based ceramic material, an organic binder, an organic solvent, a plasticizer, and a dispersant was made into a ceramic slurry through wet dispersion using a high-pressure homogenizer similar to the one used to produce the inkjet inks.

A dried and degreased powder of this ceramic slurry had a BET-equivalent diameter of approximately 250 nm.

This ceramic slurry was shaped on a PET (polyethylene terephthalate) film using the doctor blade method in such a manner that its dry thickness was 6.0 μm, yielding a ceramic green sheet.

Then a Ni paste was applied to the ceramic green sheet using a screen printer to form a Ni coating that should serve as an inner electrode. The Ni coating was formed in such a manner that its dry physical thickness was 1.0 μm, drawing a pattern such that the later-obtained cut and fired chips of the ceramic body had flat dimensions of 2.0 mm×1.2 mm. Then the inkjet ink according to each sample was applied to all the area on the ceramic green sheet not occupied by the Ni coating using a piezoelectric inkjet printer to form a leveling inkjet-printed film. The printed film was formed in such a manner that its dry physical thickness was 1.0 μm.

Then 200 ceramic green sheets having the inner-electrode Ni coating and the leveling inkjet-printed film were removed from the PET film and stacked, and this stack was compressed in a predetermined mold.

This compressed block of a multilayer body was cut into a predetermined size, yielding chips of a raw multilayer body that should serve as main components for separate multilayer ceramic capacitors.

After a 10-hour degreasing in nitrogen at a temperature of 350° C., this raw multilayer body was fired through a profile in which the multilayer body was maintained in a $N_2/H_2/H_2O$ mixed atmosphere at a temperature of 1200° C. for 2 hours with the oxygen partial pressure at $10^{-6}$ to $10^{-7}$ MPa.

As in Experiment Example 1, the appearance of each fired main component, i.e., a ceramic body containing an inner electrode, was observed for the assessment of structural defects such as delamination and cracks. One hundred main components were produced for each sample, and if the number of components with any structural defect was one or less, the sample was marked "○" in the "Structural defects" column in Table 5. If the number of components with any structural defect was two or more, the sample was marked "x" in the "Structural defects" column.

is higher than the "viscosity according to Equation 1," and at the same time the "average rheology-controlling particle diameter" is 40 nm or less.

Next, "structural defects" is discussed.

The "functional particle diameter/ceramic green sheet particle diameter" in Table 5 represents a ratio [%] of the "average functional particle diameter" to the average particle diameter of the ceramic particle that was the main component of the ceramic green sheet mentioned above. The average particle diameter of the ceramic particle that was the main component of the above ceramic green sheet was assumed to be 250 nm.

For samples 51 to 53 and 57 to 59, which had a "functional particle diameter/ceramic green sheet particle diameter" of 48% to 152%, the "structural defects" was "○" whether a rheology-controlling particle was added or not. This indicates that when forming a leveling ceramic printed film in a multilayer ceramic electronic component, one can reduce the shrinkage mismatch that occurs during firing and thus obtain a multilayer ceramic electronic component without structural defects by ensuring that the average particle diameter of the ceramic powder contained in the leveling printed film as a functional particle is in the range of 48% to 152% of the pre-firing average particle diameter of the

TABLE 5

| Sample No. | Average functional particle diameter (nm) | Average rheology-controlling particle diameter (nm) | Functional particle diameter/ ceramic green sheet particle diameter (%) | Viscosity at 1000 s$^{-1}$ (mPa · s) | Viscosity at 0.1 s$^{-1}$ (mPa · s) | Viscosity according to Equation 1 (mPa · s) | Sedimentability | Printing bleeds | Structural defects |
|---|---|---|---|---|---|---|---|---|---|
| 49 | 10 | — | 4 | 35 | 1026 | 80 | ⊙ | ○ | X |
| 50 | 50 | — | 20 | 31 | 359 | 81 | Δ | X | X |
| 51 | 100 | — | 48 | 31 | 318 | 84 | Δ | X | ○ |
| 52 | 250 | — | 100 | 26 | 195 | 99 | Δ | X | ○ |
| 53 | 400 | — | 152 | 20 | 158 | 123 | X | X | ○ |
| 54 | 500 | — | 200 | 22 | 147 | 155 | X | X | X |
| 55 | 10 | 10 | 4 | 36 | 1382 | 80 | ⊙ | ○ | X |
| 56 | 50 | 10 | 20 | 34 | 587 | 81 | ⊙ | ⊙ | X |
| 57 | 100 | 10 | 48 | 30 | 419 | 84 | ⊙ | ⊙ | ○ |
| 58 | 250 | 10 | 100 | 28 | 317 | 99 | ⊙ | ⊙ | ○ |
| 59 | 400 | 10 | 152 | 24 | 292 | 123 | ⊙ | ⊙ | ○ |
| 60 | 500 | 10 | 200 | 24 | 284 | 155 | ⊙ | ⊙ | X |

Referring to Table 5, "sedimentability" and "printing bleeds" are discussed.

Focusing on samples 49 to 54, which contained no rheology-controlling particle, the "sedimentability" was "x" or "Δ" and the "printing bleeds" was "x" for samples 50 to 54, which had an "average functional particle diameter" of 50 nm or more.

Turning to samples 55 to 60, which contained a rheology-controlling particle, samples 56 to 60, which had an "average functional particle diameter" of 50 nm or more, had a "viscosity at 0.1 s$^{-1}$" higher than the "viscosity according to Equation 1" and an "average rheology-controlling particle diameter" of 10 nm. The "sedimentability" and "printing bleeds" of these samples, i.e., samples 56 to 60, were "⊙."

These results and the results of Experiment Example 1 indicate that even with a ceramic (barium titanate) functional particle, sufficient anti-sedimentation and anti-bleeding effects are obtained when the "average functional particle diameter" is 50 nm or more, the "viscosity at 0.1 s$^{-1}$"

ceramic particle that is the main component of the ceramic layers of the multilayer ceramic electronic component.

Samples 51 to 53, containing no rheology-controlling particle, were graded "○" for "structural defects" but "x" or "Δ" for "sedimentability" and "x" for "printing bleeds," failing to meet all of three points consisting of reduced sedimentation, reduced printing bleeds, and reduced structural defects. On the other hand, samples 57 to 59, which contained a rheology-controlling particle, met all of three points consisting of reduced sedimentation, reduced printing bleeds, and reduced structural defects.

When using a ceramic powder having an average particle diameter of 50 nm or more as a functional particle in an inkjet ink for forming a leveling printed film for a multilayer ceramic electronic component, therefore, one can obtain an inkjet ink that has all of desired anti-sedimentation, anti-bleeding, and heat shrinkage characteristics by adding a rheology-controlling particle having an average particle diameter of 40 nm or less.

REFERENCE SIGNS LIST

1 Multilayer ceramic capacitor
2 Ceramic layer
3 Ceramic body
4, 5 Inner electrodes
10 Ceramic green sheet
11 Inner-electrode printed film
12 Leveling printed film

The invention claimed is:
1. An inkjet ink comprising
a functional particle having a BET-equivalent average particle diameter of 50 nm to 1000 nm;
a rheology-controlling particle having a BET-equivalent average particle diameter of 4 nm to 40 nm; and
an organic vehicle, wherein
an amount of the functional particle is in a range of 3.5% by volume to 6.9% by volume of the inkjet ink,
the inkjet ink has a viscosity of 1 mPa·s to 50 mPa·s at a shear rate of 1000 s$^{-1}$ and
the inkjet ink has, at a shear rate of 0.1 s$^{-1}$, a viscosity equal to or higher than a viscosity η calculated using an equation: $\eta=(D)^2\times\rho/10^4/2+80$,
where D is the BET-equivalent average particle diameter of the functional particle, and ρ is a specific gravity of the functional particle.

2. The inkjet ink according to claim 1, wherein the rheology-controlling particle is a ceramic material.

3. The inkjet ink according to claim 2, wherein the rheology-controlling particle is an oxide having a perovskite structure.

4. The inkjet ink according to claim 1, wherein the rheology-controlling particle is an oxide having a perovskite structure.

5. The inkjet ink according to claim 1, wherein the organic vehicle is a mixture of an organic solvent and at least one resin selected from a cellulose-based resin, an acrylic resin, and a cyclic-acetal-based resin.

6. The inkjet ink according to claim 1, wherein, when the functional particle has a volume of 100 parts by volume of the inkjet ink, an amount of addition of the rheology-controlling particle is in a range of 3.0 parts by volume to 42.4 parts by volume.

7. The inkjet ink according to claim 1, wherein the functional particle is an electroconductive particle.

8. The inkjet ink according to claim 7, wherein the electroconductive particle is at least one metal selected from the group consisting of Au, Pt, Ag, Ni, Cu, Al, and Fe or an alloy thereof.

9. The inkjet ink according to claim 1, wherein the functional particle is a ceramic particle.

10. The inkjet ink according to claim 9, wherein the BET-equivalent average particle diameter of the functional particle is in a range of 48% to 152% of a pre-firing BET-equivalent average particle diameter of a ceramic particle that is a main component contained in a ceramic layer upon which the ink jet ink is placed.

11. A printing method comprising forming a printed film of the inkjet ink according to claim 1 using an inkjet apparatus.

12. A ceramic electronic component comprising:
an electrode; and
a ceramic body holding the electrode,
wherein the electrode comprises the inkjet ink according to claim 1.

13. The ceramic electronic component according to claim 12, wherein the functional particle is an electroconductive particle.

14. The ceramic electronic component according to claim 13, wherein the electroconductive particle is at least one metal selected from the group consisting of Au, Pt, Ag, Ni, Cu, Al, and Fe or an alloy thereof.

15. The ceramic electronic component according to claim 13, wherein the rheology-controlling particle is based on a same main component as a dielectric ceramic material of the ceramic body.

16. A ceramic electronic component comprising:
a ceramic body having a plurality of stacked ceramic layers,
an inner electrode along a boundary between at least two adjacent ceramic layers of the plurality of stacked ceramic layers; and
a leveling layer in an area where the inner electrode is not formed in the boundary between the at least two adjacent ceramic layers of the plurality of stacked ceramic layers,
wherein the leveling layer comprises the inkjet ink according to claim 1.

17. The ceramic electronic component according claim 16, wherein the functional particle is a ceramic particle.

18. The ceramic electronic component according to claim 17, wherein the ceramic particle is based on a same main component as a dielectric ceramic material of the ceramic layers.

19. The ceramic electronic component according to claim 16, wherein the BET-equivalent average particle diameter of the functional particle is in a range of 48% to 152% of a pre-firing BET-equivalent average particle diameter of a ceramic particle that is a main component contained in the ceramic layers.

20. The ceramic electronic component according to claim 16, wherein
the inner electrode comprises the inkjet ink,
in the inkjet ink of the leveling layer the functional particle is a ceramic particle, and
in the inkjet ink of the inner electrode the functional particle is an electroconductive particle.

* * * * *